June 25, 1940.  J. H. MURCH ET AL  2,205,429
TEMPERATURE CONTROL MECHANISM
Filed Feb. 24, 1936  2 Sheets-Sheet 1
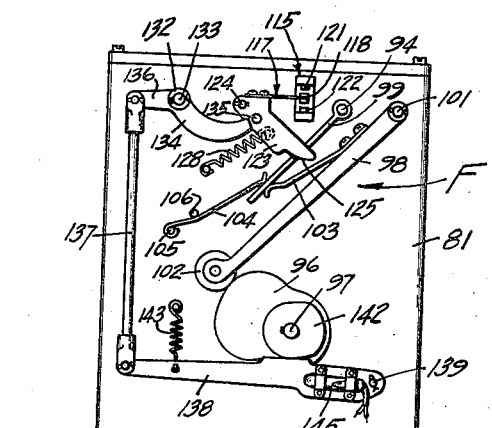
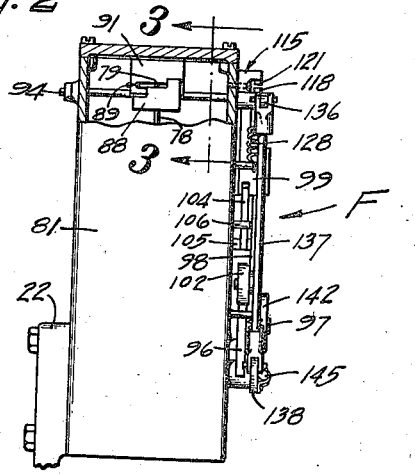
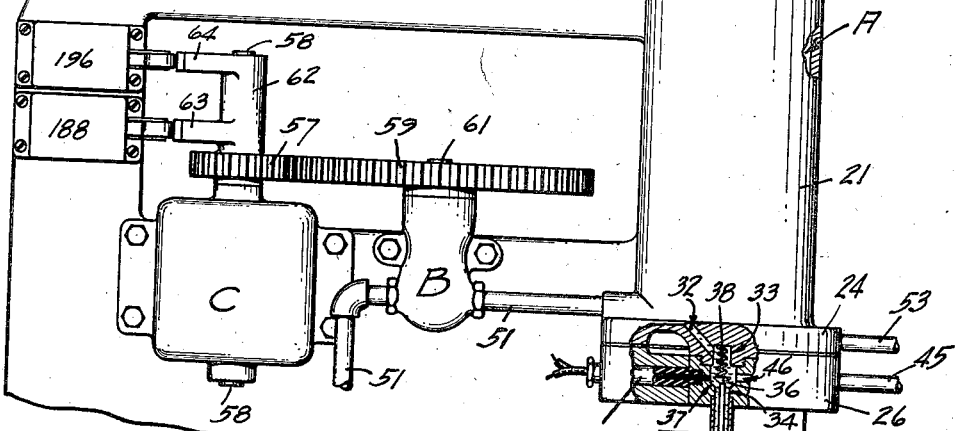
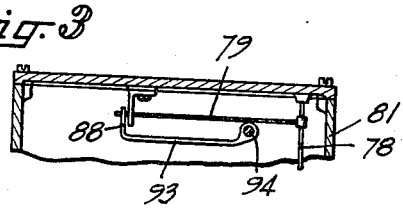
INVENTORS
John H. Murch
William Peehy
BY
Ivan W. Thornburgh
Charles H. Cate
ATTORNEYS June 25, 1940.   J. H. MURCH ET AL   2,205,429
TEMPERATURE CONTROL MECHANISM
Filed Feb. 24, 1936   2 Sheets-Sheet 2
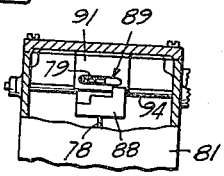
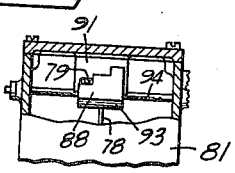
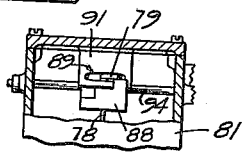
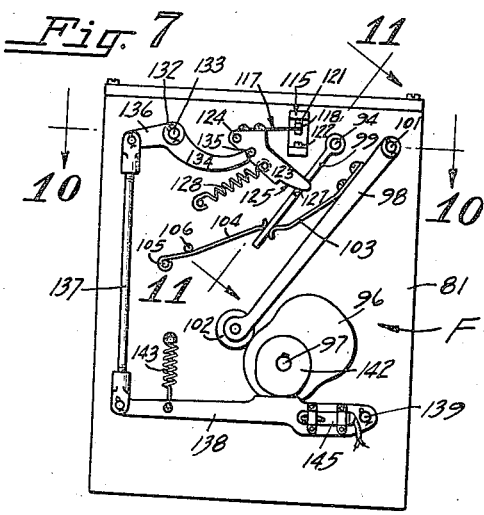
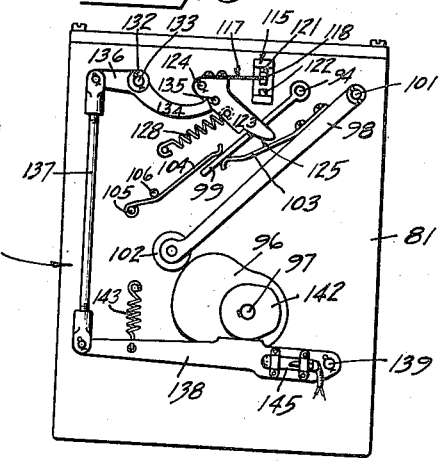
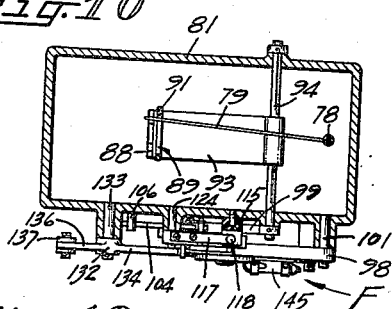
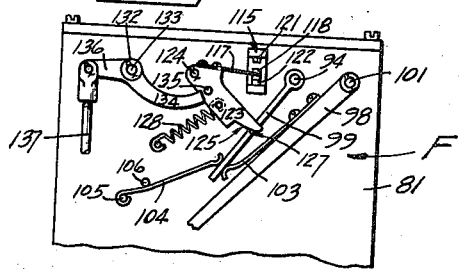
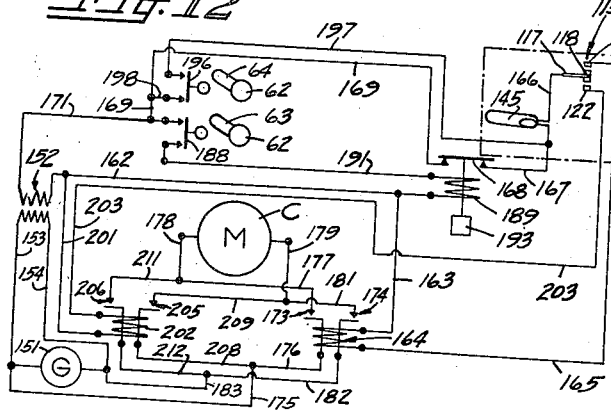

Patented June 25, 1940

2,205,429

UNITED STATES PATENT OFFICE 2,205,429

TEMPERATURE CONTROL MECHANISM

John H. Murch, East Orange, and William Pechy, Elizabeth, N. J., assignors to American Can Company, New York, N. Y., a corporation of New Jersey Application February 24, 1936, Serial No. 65,488

8 Claims. (Cl. 236—20)

The present invention relates to a temperature control mechanism for heat treating machines and has particular reference to super-sensitive devices which operate in conjunction with pyrometer-galvanometer temperature registering instruments and which control the application of heat to the machine so that the temperature will be held within very small limits and at a desired predetermined set level.

In recent years improved methods of heat treating have been devised and these require a much closer control of temperature changes than that called for in older methods. One such improved heat treating method may be mentioned by way of example, which requires extreme sensitivity of control, this having to do with flash sterilization of milk. Complete sterilization is effected by high temperatures in from one to three minutes where previous methods required much longer time at much lower temperatures. In this flash method of heat treatment, the high sterilizing temperature required is dangerously near the scorching or burning temperature of the milk and for best results effective control of the temperature is necessary.

It is therefore an object of the present invention to provide a temperature control mechanism which includes, first a pyrometer and galvanometer in circuit for gauging and registering by deflection of the galvanometer needle very small temperature changes occurring in a heat treating machine and second super-sensitive control devices a part or members of which detect the magnitude and direction of the galvanometer needle deflection and other parts or control elements which are brought into operation by such detection which regulate the application of heat to the machine and which maintain the latter at a temperature which will not vary more than one half of one degree.

Another object of the invention is the provision of such temperature control devices which detect the deflection of the galvanometer needle at frequent regular time intervals in order to determine and correct temperature changes or fluctuations of smaller magnitude than the small limits within which the ultimate temperature is required to be held.

Still another object is the provision of temperature control devices of this character wherein the regulation of heat applied to the machine is effected in small adjustments and at regular time intervals which permit an adjustment to become effective before another adjustment is made.

Numerous other objects and advantages of the invention will be apparent as it is better understood from the following description, which, taken in connection with the accompanying drawings, discloses a preferred embodiment thereof.

Referring to the drawings:

Figure 1 is a side view of the upper part of a milk sterilizing and can filling machine equipped with a temperature control mechanism embodying the instant invention, the view showing a can in filling position with the can in section, parts of the machine being broken away;

Fig. 2 is an end view of a portion of the temperature control mechanism shown at the upper left in Fig. 1, parts being broken away;

Fig. 3 is a vertical section taken substantially along the line 3—3 in Fig. 2 the view showing the location of a galvanometer needle and a cooperating detector element for detecting the needle's position;

Figs. 4, 5 and 6 are end views of the upper part of the mechanism illustrated in Fig. 2 with a portion of the outside casing wall broken away, Figs. 4 and 5 showing the galvanometer needle at one extremity of its path of travel and showing the detector element in two of its positions, prior to and after engagement with the needle, while Fig. 6 shows the needle at its opposite extreme position with the detector element in detecting engagement therewith;

Figs. 7, 8 and 9 are side views of the part of the mechanism illustrated at the upper left in Fig. 1, the views showing the movable elements in positions corresponding with the positions of the galvanometer needle and detector element shown in the respective Figs. 4, 5 and 6;

Fig. 10 is a horizontal section taken substantially along the line 10—10 in Fig. 7;

Fig. 11 is a part elevation, part sectional detail as viewed substantially along the inclined line 11—11 in Fig. 7; and Fig. 12 is a wiring diagram of the electric circuits utilized in the control mechanism.

The drawings illustrate a preferred embodiment of the present invention which for the purposes of this specification is preferably applied to a milk sterilizing and filling machine in which milk is sterilized by passing it through a suitable chamber A (Fig. 1) which is heated by steam under pressure to a predetermined sterilizing temperature. The sterilized milk is filled into cans which may be closed in any suitable manner.

In such a machine best sterilizing results are attained when the sterilizing temperature is maintained substantially constant so that it does not fluctuate at most more than one-half degree. To maintain this temperature the pressure of the steam entering the sterilizing chamber is automatically controlled by a heat regulator or pressure regulator valve B (Fig. 1) which is opened and closed by electric means which include a reversible electric motor C to increase or reduce the steam pressure in accordance with slight fluctuations of the sterilizing temperature.

To this end thermo-electric instrumentalities are utilized which include a pyrometer D provided for gauging the temperature of the sterilizing chamber. The pyrometer is connected in circuit with a suitable galvanometer E (schematically shown in Fig. 12) which by deflection of its needle indicates a temperature change in the milk or in the sterilizing chamber and indicates by this mechanical movement whether the temperature is above or below the desired predetermined sterilizing temperature.

To insure that temperature changes do not exceed a predetermined setting of less than one half degree, the deflection of the galvanometer needle is preferably detected at regular time intervals of two or three seconds. This detection is effected by a cam actuated super-sensitive control device F (Fig. 1) which establishes suitable electric circuits some of the circuits including the electric motor C that in turn operates the steam pressure valve B. Electric energy from a suitable source of power is thus caused to flow through the motor in the proper direction so that it will rotate the latter to partially open or close the pressure valve as the case may be. After such an adjustment of the pressure valve, electric elements included in some of the circuits operate to prevent further actuation of the motor until the adjustment has had time to become effective on the sterilizing temperature.

In this manner slight changes within such small ranges as one half degree or less in the sterilizing temperature effect quick and positive partial or complete opening or closing of the steam pressure valve. Such adjustment of the valve regulates the steam pressure in the chamber to maintain the sterilizing temperature substantially constant.

The milk sterilizing chamber A of the machine shown in Fig. 1 of the drawings is housed in a vertical tubular casing 21 which is mounted on a main frame 22 of the machine. At its upper and lower ends the casing is formed with flanges 23, 24 to which head caps 25, 26 are bolted to completely seal off the chamber. It is this chamber through which milk is passed and heated by steam under pressure to a sterilizing temperature.

Milk to be sterilized enters the chamber by way of a horizontal supply pipe 31 the discharge end of which is threaded into the edge of the upper flange 23 of the casing 21 and the pipe in this way communicates with the sterilizing chamber. The milk when sterilized is discharged from the bottom of the chamber by way of a port 32, a central cylindrical recess 33, a vertical bore 34, and a milk discharge tube 35 which is carried in the lower end of the bore 34.

Discharge of the sterilized milk from the tube 35 is effected by a poppet valve 36 located in the recess 33 and which is adapted to be opened and closed by vertical movement. The valve when closed seats against a valve seat 37 formed in the bottom wall of the recess and is held in this position by a coil spring 38 which is confined within the recess. Opening of the valve is effected by a lifting stem 39 formed integrally with the valve and which extends down through the discharge tube 35 and projects from the lower end thereof.

A can $a$ to be filled with the sterilized milk is positioned under the discharge tube 35 on a lifter pad 42 which is raised by any suitable means actuated in time with the other moving parts of the machine. Raising of the pad and the can carried thereon causes the can bottom to engage against the lower end of the valve stem 39 and thus lift the valve 36 against the resistance of the spring 38. This lifting of the valve permits milk to flow through the port 32, recess 33, bore 34 and discharge tube 35 into the can. When the can is filled lowering of the lifter pad causes the spring 38 to close the valve.

To prevent the milk from scorching or burning when the discharge valve 36 is closed as between filling of the cans the milk is continuously circulated through the sterilizing chamber. This circulation is maintained by a by-pass pipe 45, one end of which is threaded into the lower head cap 26. This end of the pipe communicates with a passageway 46 which is formed in the head cap and which leads into the central recess 33. The opposite end of the pipe communicates with the source of milk. Hence milk not filled into cans flows through the passageway 46 and pipe 45 back to its source to be again passed through the chamber. The quantity of milk thus by-passed is quite negligible, however, because the cans to be filled move rapidly in a continuous procession under the discharge valve and hence the time between fillings is very short.

The steam for sterilizing the milk is introduced into the chamber A from any suitable source of supply as by way of a pipe line 51. The discharge end of this pipe is threaded into the side of casing 21 near its bottom flange 24. The steam circulates through the chamber, separated from the milk in any suitable manner, and is carried off by an outlet pipe 52 one end of which is threaded into the upper end of the casing adjacent its flange 23. Condensate caused by cooling of the steam in the heating element containing steam supplied by the pipe 51 is discharged through a drain pipe 53 having one end threaded into the steam pipe.

The pressure regulator valve B which controls the steam pressure in the sterilizing chamber is connected into the supply pipe line 51 and is bolted to the main frame 22 of the machine. Adjacent this valve, the reversible electric motor C which opens and closes the valve is bolted to the same main frame. The motor and the valve are geared together by a driving pinion 57 which is carried on the motor drive shaft 58 and a meshing gear 59 mounted on the stem (marked 61) of the regulator valve. Rotation of the motor in one direction opens the valve to increase the steam pressure in the sterilizing chamber and vice versa when the motor rotates in the opposite direction the valve is closed to reduce the steam pressure.

Rotation of the motor in either direction is limited to a single revolution and to insure the proper timing the motor shaft 58 carries a sleeve 62 which is formed with cam projections 63, 64. These projections operate stop switches associated with the electric circuits of the wiring diagram of Fig. 12.

Rotation of the motor C is controlled by the establishment of suitable electric circuits which are completed by a main control electric switch and its auxiliary electric switches which form a part of the super-sensitive control device F and which are mechanically closed when the sterilizing temperature in the chamber rises above or falls below that desired. These switches and circuits will be described hereinafter in connection with the wiring diagram shown in Fig. 12.

Fluctuation of the sterilizing temperature is gauged, or measured and is indicated by a standard commercial thermoelectric pyrometer-galvanometer unit diagrammatically illustrated at the right in Fig. 12 and which constitutes the pyrometer D and the galvanometer E hereinbefore mentioned. The construction and operation of such a unit is well known in the art of gauging temperatures in heat treating machines and therefore an extended description is deemed unnecessary.

The pyrometer D consists of the usual hot and cold terminals which comprise the usual pairs of dissimilar metallic wires connected together to form the junctions. The hot terminal is disposed in the central milk recess 33 of the casing 21 and directly contacts the milk. The cold terminal is located at any convenient place outside the casing 21 and is maintained at a constant temperature below that of the milk.

The galvanometer E is connected in circuit in the usual manner with the pyrometer D and is located in a covered housing 81 which carries the control devices F. This housing is supported on the main frame 22 (Fig. 1) and is formed with suitable bearings for the galvanometer rotor shaft indicated by the numeral 78. This shaft carries the galvanometer needle (marked 79).

Periodically within regular time intervals of a few seconds a test is made to detect the position of the galvanometer needle 79 so that any fluctuation in the sterilizing temperature may be immediately ascertained. This is effected by the control device F which is provided with members actuated in time with the other moving parts of the machine and these will now be described.

The position of the galvanometer needle is detected by a detector plate 88 (Figs. 2, 3, 4, 5, 6 and 10) formed on one end of an arm 93 mounted on a horizontal rock shaft 94 carried in suitable bearings in the sides of the control housing 81. The shaft is adapted to be rocked to move the detector plate vertically into engagement with the free end of the horizontally swung galvanometer needle. To prevent distortion of the needle during this detecting operation, its forward end is disposed in a horizontal slot 89 formed in a backing-up plate 91 which is bolted to the bottom of the cover of the control housing 81.

The detector plate 88 is formed with a set of three ascending needle engaging steps as clearly shown in Figs. 2, 4, 5 and 6. When the sterilizing temperature falls below the predetermined degree the deflection of the needle will align it with and it will be engaged by the low step as shown in Figs. 4, 5 and 10. When the temperature is above the predetermined degree the deflected needle will align with and be engaged by the high step (Fig. 6) and when no change of temperature takes place the needle will align with and be engaged by the middle step (Fig. 2).

Thus the deflection of the needle is indicated by the particular step with which it aligns. This deflection or rather position of the needle limits the travel of the detector plate which is moved a different vertical distance for each step. This is used at very small intervals of time to control the sterilizing temperature.

Rocking of the rock shaft 94 to move the detector plate 88 into needle engaging position is effected by an edge cam 96 which is mounted on a cam shaft 97 journaled in suitable bearings formed in the housing 81. The cam shaft is continuously rotated in time with the other moving parts of the machine in any suitable manner.

Movement of the cam 96 is imparted to the rock shaft through a cam arm 98 and an indicator arm 99 which are yieldingly associated and at times are moved in unison. One end of the cam arm 98 is mounted on a pivot pin 101 which is carried in a suitable boss formed on the outside of the housing 81 while the free end of the arm carries a roller 102 which engages against the cam edge.

The indicator arm 99 is disposed adjacent the cam arm 98 on the outside of the housing 81 and is secured at one end to an end of the rock shaft 94 which extends through the side of the housing. The free end of the indicator arm is yieldingly held between two flat springs 103, 104, ends of which engage against opposite sides of the arm. The opposite end of the spring 103 is secured to the cam arm 98. This spring tends to push the cam arm away from the indicator arm with the result that the roller 102 is kept in engagement with the cam 96. The opposite end of the other spring 104 is secured by a pin 105 to the side of the housing 81, the spring intermediate its ends engaging against a stationary post 106. This post bows the spring and holds it against the indicator arm.

Thus through the medium of these springs the indicator arm 99 and the cam arm 98 are moved in unison under the influence of the cam 96 or are yieldably shifted relative to each other. The full movement of the cam arm is more than the throw of the indicator arm, which throw it will be recalled is limited by the movement of the plate 88 into any one of its three vertical positions in detecting the location of the galvanometer needle and the overthrow of the cam 96 is taken up by the yielding spring 103. The setting of the main control electric switch is effected by other elements of the control devices F which will now be described.

The main control switch consists of a double contact electric switch 115 (Figs. 1, 7, 8, 9 and 10) which is secured to the side of the housing 81 adjacent the indicator arm 99. The switch is provided with a horizontally disposed movable element 117 which is a flat spring having at one end a contact 118 which extends between upper and lower spaced switch contacts 121, 122 of the switch 115.

The spring 117 is secured to a movable selector pawl 123 which is normally held against movement by cam action which will be hereinafter described. The movable selector is periodically released by such cam action to set the switch 115 in accordance with the position of the indicator arm 99. The pawl is disposed adjacent the indicator arm 99 and is mounted on a pivot pin 124 carried in the side of the housing 81. The free end of the pawl overlaps the indicator arm and is formed with a curved cam edge 125 which extends into a shouldered notch 127 which is cut into the outer edge of the indicator arm as shown in Fig. 11.

When released to set the switch to correspond with the position of the indicator arm, the selector pawl 123 rocks on its pivot pin 124 until its cam edge 125 engages the shoulder of the indicator arm notch 127. By reason of the cam shape this rocking movement is greater or less for different positions of the indicator arm 99, as will be more fully explained. This movement of the pawl is effected by a coil spring 128 one end of which is hooked over a pin secured in the pawl. The opposite end of the spring is hooked over a pin carried in the side of the housing 81.

Different positions of the pawl 123 locate the contact 118 of the movable switch element 117 into engagement with either of the switch contacts 121, 122 or into a non-engaging and intermediate position. This establishes or breaks certain electric circuits which control the operation of the motor C associated with the steam regulator valve B.

The working position of the movable switch element 117 thus depends upon how far the selector pawl 123 is rocked by the spring 128.
Movement of the pawl is thus limited by the position of the indicator arm 99 as located when the galvanometer needle deflection is detected as hereinbefore described. In other words as the sterilizing temperature rises above or falls below the predetermined degree, the indicator arm is set nearer to or further away from the selector pawl.

The cam edge 125 of the pawl 123 is normally held away from the shoulder of the notch 127 to permit free movement of the indicator arm 99 while it is being located to indicate the deflection of the galvanometer needle. This holding of the pawl is cam controlled as previously suggested and is effected by a lever 132 which is mounted on a pivot pin 133 carried in the side of the housing 81.

The lever has a curved arm 134 the free end of which engages against a pin 135 carried in the pawl 123 and when so engaged holds the cam edge 125 spaced above the shoulder of the indicator arm notch 127 and against the resistance of the pawl spring 128. In this position of the pawl the movable switch contact 118 is held against the upper contact 121 of the switch
115. No completed circuit is established at this time, however, because of a normally open mercury switch which is used in the circuit to properly time the opening of the valve B, and which will be hereinafter explained.

The lever 132 is provided with an arm 136 which is connected to one end of a link 137. At its opposite end the link 137 is connected to a cam arm 138. The cam arm 138 is carried on a pivot pin 139 secured in the side of the housing
81. This arm extends under and engages against a selector edge cam 142 which is mounted adjacent the detector cam 96 on the continuously rotated cam shaft 97.

The arm is urged against the cam surface by a coil spring 143. One end of the spring is hooked into a hole in the arm while the other end is hooked over a pin carried in the housing 81. This constitutes the cam control of the pawl 123 and rotation of the cam 142 pivots the cam arm 138 and hence moves the link 137 and curved arm 134 to release the pawl 123 at the proper time to set the contacts of the main control switch 115.

Setting of the contacts of the main control switch 115 is followed by the closing of a mercury timing switch 145 hereinbefore briefly mentioned and which is carried in a horizontal position on the cam arm 138. The mercury switch is of a well known type comprising a glass tube closed at both ends and containing a globule of mercury free to move, with the inclinations of arm 133, into and out of engagement with a pair of spaced contacts disposed in one end of the tube and which form a part of the electric circuits shown in Fig. 12.

Movement of the cam arm 138 tips the mercury switch and causes the globule of mercury to close or open the space between the contacts and thereby close or open the switch. It is this switch which prevents the establishment of a circuit when the upper contact 121 of the switch 115 is first engaged by the movable contact 118 while the pawl 123 is being held away from the shoulder of the indicator arm notch 127. It is only when mercury switch 145 is closed that a circuit is established through the main control switch 115 and this permits the closing of the circuit only after all of the pawl and indicator movements just described have been fully completed. This will now be fully explained.

Considering first that condition of the machine wherein the sterilizing temperature of the milk falls slightly below the predetermined set temperature the circuit which is established through the main control switch 115 results in a flow of electric energy through the motor C causing the motor to operate in a direction of rotation which will open the steam regulator valve B. It will be recalled that for this temperature condition the galvanometer needle is deflected into alignment with the low step of the detector plate 89 and is engaged thereby when the latter is moved up to set the indicator arm 99.

In this position of the indicator arm which is illustrated in Fig. 8 the restricted movement of the released pawl 123 held by the indicator arm is not sufficient to break the engagement between the movable contact 118 and the upper fixed contact 121 of the switch 115. Thus closing of the mercury switch 145, which it will be recalled is simultaneous with the movement of the pawl 123, establishes this desired control circuit which in turn establishes the proper direction or power circuit through the motor C.

Referring now to the wiring diagram in Fig. 12 it will be observed that electric energy is supplied from any suitable source of power as for example a generator 151. Energy for the power or motor circuit is taken direct from the generator whereas energy for the control circuits is taken from a step down transformer 152 which is connected by wires 153, 154 to opposite terminals of the generator.

With the contacts 121, 118 of the switch 115 and the mercury switch 145 all closed, electric current from the transformer 152 flows through a circuit comprising a main lead wire 162, wire 163, double pole relay 164, wire 165, contacts 121, 118 of switch 115, wire 166, mercury switch 145, wire 167, a time relay switch 168, wire 169 and thence back to the transformer along a return wire 171.

This current flowing through the circuit energizes the relay 164 and thus causes its double pole contacts to close against a pair of switch points 173, 174. Closing of the relay immediately establishes the power or motor circuit through which current flows from the generator 151 by way of wires 175, 176, switch point 173, wires 177, 178, through the motor C and returning to the generator along wires 179, 181, switch point 174, and wires 182, 183. This energy rotates the motor in a valve opening direction through one revolution to partially open the steam regulator valve B and thereby compensate for the fall in sterilizing temperature by slightly increasing the pressure and hence the temperature of the steam entering the sterilizing chamber.

When the motor has made one complete revolution it is automatically stopped. This is effected by the cam projection 63 (see also Fig. 1). The cam projection engages against the movable element of a stop switch 188 to momentarily close the latter. Closing of this switch establishes a time relay circuit which includes the time relay switch 168 and which receives its current from the transformer 152. Current flows from the transformer through the circuit along the wire 162, through a solenoid 189 associated with the time relay, a wire 191, switch 188 and returns by way of the wire 171.

Momentary energization of the solenoid 189 opens the time relay switch 168 and thereby breaks the main control circuit. This action de-energizes the relay 164 which breaks the motor circuit and thus stops the motor.

A dash pot 193 is connected with the time relay switch 168 and when the latter is opened the dash pot acts to prevent immediate closing of the switch to permit the change in the steam pressure caused by the partial opening of the regulator valve to become fully effective in the chamber before another adjustment is made. The switch closes slowly and is only fully closed after a predetermined period of time has elapsed. It has been found that thirty seconds' time lapse is sufficient for most efficient operation of the mechanism. While the time relay is open the motor cannot be operated.

When under load of opening or closing the regulator valve the motor in stopping may stop short, unless provision is made to prevent this, so that the cam 63 on the motor shaft will not have sufficient time to clear the switch 188 and permit it to open. If this is allowed to take place the switch 188 would be held closed and the time relay solenoid 189 would be maintained energized and thereby would hold the time relay switch 168 open so that the mechanism would become disabled. To prevent such an occurrence provision is made in the instant case for current to be drawn from the main circuit to keep the motor circuit intact and hence keep the motor in operation until the cam is clear of this switch.

Operation of the motor is momentarily maintained for this purpose by the cam projection 64 (see also Fig. 1) which closes a stop switch 196 of the control circuit simultaneously with the closing of the stop switch 188. While switch 196 is closed current flows from the wire 167 of the main circuit, along a wire 197, through the switch 196, a wire 198, wires 169, 171 to the transformer. Thus the main circuit is held intact and the motor continues to operate until the cam projection 63 has moved past the switch 188 and has permitted the latter to open. When both stop switches 188, 196 are open the motor stops.

After the time period has elapsed and the time relay switch 168 has fully closed, the next detection of the galvanometer needle deflection, as effected mechanically by the detector plate 88 and its associated parts, may disclose that the chamber temperature is still below the desired predetermined degree and that therefore the steam regulator valve should be further opened. In this case the above described circuits are reestablished to cause another complete revolution of the motor C in the same direction.

If the temperature has returned to the desired predetermined degree, the galvanometer needle 79 will swing into its normal centralized position where it is in alignment with the middle step of the detector plate 88. When the step is moved into engagement with the needle as shown in Fig. 2 the indicator arm 99 will be brought to rest in a position as shown in Fig. 1. Movement of the selector pawl 123 will then be such as to locate the movable contact point 118 of the switch 115 centrally between the switch contacts 121, 122, not engaging either of them. Thus when the mercury switch 145 closes, no circuits will be established hence no adjustment of the regulator valve B will be effected and the steam pressure in the sterilizing chamber will remain unaltered.

When the chamber temperature rises above the desired predetermined degree the motor C is rotated in the opposite or steam valve closing direction to partially close the steam regulator valve B to reduce the steam pressure in the chamber. Under this temperature condition the galvanometer needle 79 is in alignment with the high step of the detector plate 88. Hence when the plate is lifted the high step will engage the needle as shown in Fig. 6 and the indicator arm 99 will be stopped in a position as shown in Fig. 9. This position of the indicator arm permits the greatest travel of the pawl 123 which now carries the movable switch contact 118 into engagement with the lower contact 122 of the switch 115.

Again referring to the wiring diagram in Fig. 12 with the switch contacts 118, 122 and the mercury switch 145 closed, electric energy now flows from the transformer 152 along wire 162, a wire 201, double pole relay 202, wire 203, switch contacts 118, 122, wire 166, mercury switch 145, wire 167, time relay switch 168, wires 169, 171, back to the transformer.

The relay 202 is thus energized and its double pole contacts close against a pair of switch points 205, 206 which establishes the motor circuit in the reverse or valve closing direction. Current then flows from the generator 151 along wire 175, a wire 208, switch point 205, wires 209, 179, through the motor C and returns to the generator along wires 178, 211, switch point 206, and wires 212, 183. Thus electric energy is supplied to the motor in a reverse direction which causes it to rotate in reverse and to partially close the regulator valve B. Stopping of the motor is effected by the cam projections 63, 64 in the same manner as hereinbefore described.

It should be understood that the operation of the control mechanism is substantially continuous. As the cooling effect of the milk, which continuously passes through the chamber, alters the sterilizing temperature within such small ranges as one half degree or less, the temperature change is immediately gauged by the pyrometer and indicated by the deflection of the galvanometer needle 79. This deflection is mechanically detected by the detector plate 88 preferably every two or three seconds and the operation of the motor and steam regulator valve preferably every thirty seconds so that any time within two or three seconds after the motor time relay has closed, the motor may again be operated to correct any small change in sterilizing temperature. In this manner continuous operation and regulation is had over the sterilizing temperature while at the same time allowing for changes in the steam pressure to become effective.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A temperature control mechanism for maintaining a substantially constant temperature in heat treating machines, comprising in combination means for supplying heat to a machine, a heat regulator through which the heat is supplied, electric means connected with suitable electric circuits for adjusting said heat regulator, thermo-electric instrumentalities for gauging a change of temperature in the machine, means cooperating with and controlled by said instrumentalities and comprising a galvanometer needle and stepped detector elements selectively engageable with the same for establishing said electric circuits in accordance with the changing temperature of the machine, and means cooperating with said electric circuits for maintaining said electric means inoperative for a predetermined period of time after an adjustment of said heat regulator to permit said adjustment to become effective.

2. A temperature control mechanism for maintaining a substantially constant temperature in heat treating machines, comprising in combination means for supplying heat to a machine, a heat regulator through which the heat is supplied, electric means connected with suitable electric circuits for operating said heat regulator, thermo-electric instrumentalities for gauging a change of temperature in the machine, means constantly cooperating with and controlled by said thermo-electric instrumentalities and comprising a galvanometer needle and stepped detector elements selectively engageable with the same for establishing said electric circuits to cause operation of said electric means in accordance with the changing temperature in the machine, a time relay cooperating with said electric circuits for maintaining said electric means inoperative for a predetermined period of time after an adjustment of said heat regulator to permit said adjustment to become effective, and devices in said circuits and operable by said electric means for insuring proper functioning of said time relay.

3. A temperature control mechanism for maintaining a substantially constant temperature in heat treating machines, comprising in combination means for supplying heat to a machine, a heat regulating valve, a reversible electric motor connected with suitable electric circuits for opening and closing said valve, a pyrometer and a galvanometer in circuit for detecting temperature changes as they occur in the machine, said galvanometer carrying a needle adapted to be deflected by the operation of said pyrometer, a detector member including a plurality of stepped needle engaging faces pivotally mounted to swing at right angles to the path of movement of said needle for detecting and indicating said needle deflections, means controlled by said detector member for establishing said motor circuits for actuating said electric motor so as to adjust said valve in accordance with the deflections of said galvanometer needle to maintain the temperature in the machine substantially constant, and means cooperating with said electric circuits for maintaining said reversible electric motor inoperative for a predetermined period of time to permit disengagement of said galvanometer needle with said detector member.

4. A temperature control mechanism for maintaining a substantially constant sterilizing temperature in the sterilizing chamber of a milk sterilizing and filling machine, comprising in combination devices for charging milk into and for discharging it from said chamber, means for heating the milk to a sterilizing temperature while in said chamber, a heat regulator, instrumentalities for gauging a change of temperature in the milk, control devices including a galvanometer needle and a stepped detector member engaging the same for cooperating with said instrumentalities for adjusting said heat regulator to maintain the milk at a substantially constant sterilizing temperature, and means cooperating with said control devices for preventing the adjustment of said heat regulator until after disengagement of said galvanometer needle with said detector member.

5. A temperature control mechanism for maintaining a substantially constant sterilizing temperature in a milk sterilizing and filling machine, comprising in combination a milk sterilizing chamber, devices for charging milk into and discharging it from said chamber, means for heating the milk to a sterilizing temperature while in said chamber, a heat regulating valve, electric means connecting with suitable electric circuits for adjusting said regulating valve to maintain said sterilizing temperature substantially constant, a pyrometer and a galvanometer in circuit for gauging temperature changes in the milk, said galvanometer having a needle adapted to be deflected by the operation of said pyrometer, a stepped detector member engageable with said galvanometer needle for detecting and indicating a deflected position of the latter, means controlled by said members for establishing said electric circuits to cause said electric means to adjust said regulating valve in order to compensate for a temperature change as indicated by the position of said galvanometer needle, and means cooperating with said electric circuits for maintaining said electric means inoperative until after disengagement of said galvanometer needle with said detector member.

6. In a temperature control mechanism for maintaining a substantially constant sterilizing temperature in a milk sterilizing and filling machine having a discharge unit for filling sterilized milk into containers: the combination of a milk sterilizing chamber, devices for charging milk into said chamber, means for heating the milk to a sterilizing temperature while in said chamber, a heat regulator, instrumentalities for gauging a change of temperature in the milk, means cooperating with said instrumentalities and comprising a galvanometer needle and stepped detector elements selectively engageable with the same for adjusting said heat regulator to maintain the milk at a substantially constant sterilizing temperature, and means cooperating with said gauging instrumentalities for maintaining said heat regulator adjusting means inoperative for a predetermined period of time to permit said change in temperature of the milk to be ascertained.

7. A temperature control mechanism for maintaining a desired temperature in heat treating machines, comprising in combination means for supplying heat to a machine, a heat regulator through which the heat is supplied, electric means connected with suitable electric circuits for adjusting said heat regulator, thermo-electric instrumentalities for gauging a change of temperature in the machine and for translating it into a mechanical movement, members for detecting said mechanical movement, an indicator movable by said members into a position which indicates the magnitude and direction of said detected movement, constantly movable elements controlled by the position of said indicator and comprising high, low and intermediate steps for establishing said electric circuits to cause operation of said electric means in accordance with the temperature changes in the machine, and means including a cam actuated latch device cooperating with said thermo-electric instrumentalities for temporarily maintaining said electric means inoperative to permit said translated mechanical movement to become effective.

8. A temperature control mechanism for maintaining a substantially constant temperature in heat treating machines, comprising in combination, means for supplying heat to a machine, a heat regulator through which the heat is supplied, thermo-electric instrumentalities for gauging a change of temperature in the machine and for translating said change into a mechanical movement, means including a swinging member for detecting the magnitude and direction of said mechanical movement, said member being brought into a position to correspond with a setting for said change of temperature, elements cooperating with said detecting means for adjusting said heat regulator, and cam controlled means for delaying the operation of said adjusting elements by movement determined in accordance with the setting of said swinging member to temporarily render said adjusting elements inoperative to permit said translated mechanical movement to become effective.

JOHN H. MURCH.
WILLIAM PECHY.